United States Patent
Son et al.

(10) Patent No.: US 11,373,770 B2
(45) Date of Patent: Jun. 28, 2022

(54) NUCLEAR FUEL ROD END DISTANCE ADJUSTING DEVICE

(71) Applicant: KEPCO NUCLEAR FUEL CO., LTD., Daejeon (KR)

(72) Inventors: Se Ick Son, Daejeon (KR); Je Won Lee, Daejeon (KR); Sung Jun Park, Daejeon (KR); Du Hyun Rue, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 78 days.

(21) Appl. No.: 16/961,050

(22) PCT Filed: Apr. 5, 2018

(86) PCT No.: PCT/KR2018/004009
§ 371 (c)(1),
(2) Date: Jul. 9, 2020

(87) PCT Pub. No.: WO2019/146840
PCT Pub. Date: Aug. 1, 2019

(65) Prior Publication Data
US 2021/0065920 A1    Mar. 4, 2021

(30) Foreign Application Priority Data
Jan. 29, 2018    (KR) .................. 10-2018-0010619

(51) Int. Cl.
*G21C 19/10*    (2006.01)
*G21C 3/334*    (2006.01)
(Continued)

(52) U.S. Cl.
CPC ............. *G21C 19/10* (2013.01); *G21C 3/334* (2013.01); *G21C 3/33* (2013.01); *G21C 7/30* (2013.01)

(58) Field of Classification Search
CPC .......... G21C 19/10; G21C 3/334; G21C 3/33; G21C 7/30
(Continued)

(56) References Cited

U.S. PATENT DOCUMENTS

2006/0146974 A1    7/2006    Crawford
2007/0079496 A1    4/2007    Vandergheynst et al.

FOREIGN PATENT DOCUMENTS

JP    S61116690 A  *  6/1986
KR    20080006615 A     1/2008
(Continued)

OTHER PUBLICATIONS

International Search Report issued by ISA/KR in connection with PCT/KR2018/004009 dated Sep. 14, 2018.

*Primary Examiner* — Jack W Keith
*Assistant Examiner* — Daniel Wasil
(74) *Attorney, Agent, or Firm* — Levenfeld Pearlstein, LLC (57) ABSTRACT

A nuclear fuel rod end distance adjusting device includes an insertion rod, a housing having a hollow space, insertion power means installed inside the housing, a connector connected between the insertion power means and the insertion rod, and an anti-rotation tool installed between the insertion power means and the connector. The insertion rod includes nuclear fuel rod tongs and configured to linearly move forward and backward. The insertion power means is configured to move in a longitudinal direction of the housing by converting a rotational motion into a linear motion. The anti-rotation tool is configured to move in the longitudinal direction of the housing by being interlocked with the linear motion of the insertion power means, but preventing rotational force of the insertion power means from being transmitted to the connector. Thereby, movement and end dis- (Continued)

tance of the fuel rods can be more minutely and stably adjusted.

6 Claims, 6 Drawing Sheets

(51) Int. Cl.
    *G21C 3/33*         (2006.01)
    *G21C 7/30*         (2006.01)

(58) Field of Classification Search
    USPC ........................................................ 376/261
    See application file for complete search history.

(56) References Cited

FOREIGN PATENT DOCUMENTS

| | | | |
|---|---|---|---|
| KR | 20100037259 A | * | 4/2010 |
| KR | 20100037259 A | | 4/2010 |
| KR | 20130080350 A | | 7/2013 |
| WO | 2006125080 A2 | | 11/2006 |
| WO | 2006125080 A3 | | 11/2006 |
| WO | 2019146840 A1 | | 8/2019 |

* cited by examiner

FIG. 1

-- Prior Art --

FIG. 2

-- Prior Art --

NUCLEAR FUEL ROD END DISTANCE ADJUSTING DEVICE

This is a National Stage Application of International Patent Application No. PCT/KR2018/004009, filed Apr. 5, 2018, which claims the benefit of and priority to Korean Application No. 10-2018-0010619, filed Jan. 29, 2018, the entirety of which are incorporated fully herein by reference.

TECHNICAL FIELD

The present invention relates to a nuclear fuel rod end distance adjusting device and, more particularly, to a nuclear fuel rod end distance adjusting device improving convenience and accuracy of an adjustment of a nuclear fuel rod end distance.

BACKGROUND ART

A nuclear power plant is configured to heat primary coolant using energy generated during nuclear fission by using nuclear fuel inside a nuclear reactor, to transfer energy to secondary coolant using heated energy to generate steam at a steam generator, and to produce electricity in a generator by converting rotational energy at a steam turbine by using steam generated at the steam generator At this time, the nuclear reactor refers to an apparatus made to be used for various purposes such as generating heat, producing radioactive isotopes and plutonium, providing a radiation field, or the like, by artificially controlling the fission reaction of fissile material.

In general, enriched uranium in which the ratio of uranium-235 is raised to 2-5% is used in light water reactors, and in order to process uranium into nuclear fuel used in nuclear reactors, a molding process to make the uranium into a cylindrical pellet weighing about 5 g is performed.

Meanwhile, an energy source for nuclear fission is provided through nuclear fuel.

Figure 1:
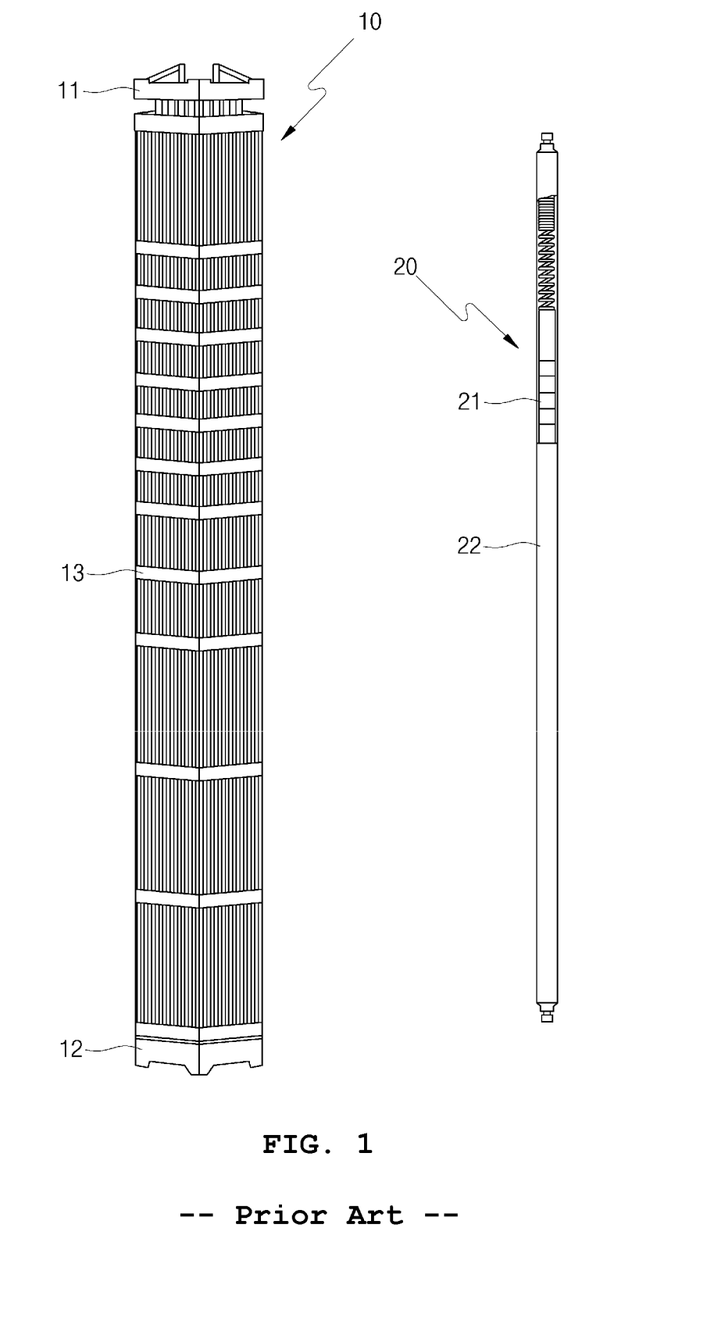
FIG. 1 shows views showing a typical nuclear fuel assembly and a nuclear fuel rod.

The nuclear fuel arranged inside the nuclear reactor is composed of a unit of a nuclear fuel assembly 10 as shown in FIG. 1, and the nuclear fuel assembly 10 includes: a skeleton including a top nozzle 11, a bottom nozzle 12, and spacer grids 13; and fuel rods 20 inserted inside the spacer grids 13 and supported by springs and dimples provided in the spacer grids 13.

At this time, each nuclear fuel rod 20 includes uranium of a unit of pellets 21 and a zirconium alloy cladding tube 22 to protect the uranium and to prevent radioactive leakage and is provided in a shape of a long bar.

In order to manufacture such a nuclear fuel assembly 10, and in order to prevent scratches on a surface of the nuclear fuel rod 20 and to prevent damage to the spacer grids 13, a lacquer is applied on the surface of the fuel rod 20, the fuel rod 20 is inserted into the skeleton, and then the fuel rod 20 is attached and fixed by the top nozzle 11 and bottom nozzle 12, whereby assembling the nuclear fuel assembly 10 is finished.

On the other hand, an insertion process of the nuclear fuel rods 20 into the fuel assembly 10 is carried out in units of rows in the spacer grid 13, and due to characteristics of the insertion process, the difference (no greater than 5 mm) occurs in an insertion length of the nuclear fuel rods 20 after the insertion process.

Accordingly, in order to satisfy design requirements for a fuel rod 20 end distance, an adjustment of the insertion length of the fuel rod 20 is made using a nuclear fuel rod end distance adjusting device.

Figure 2:
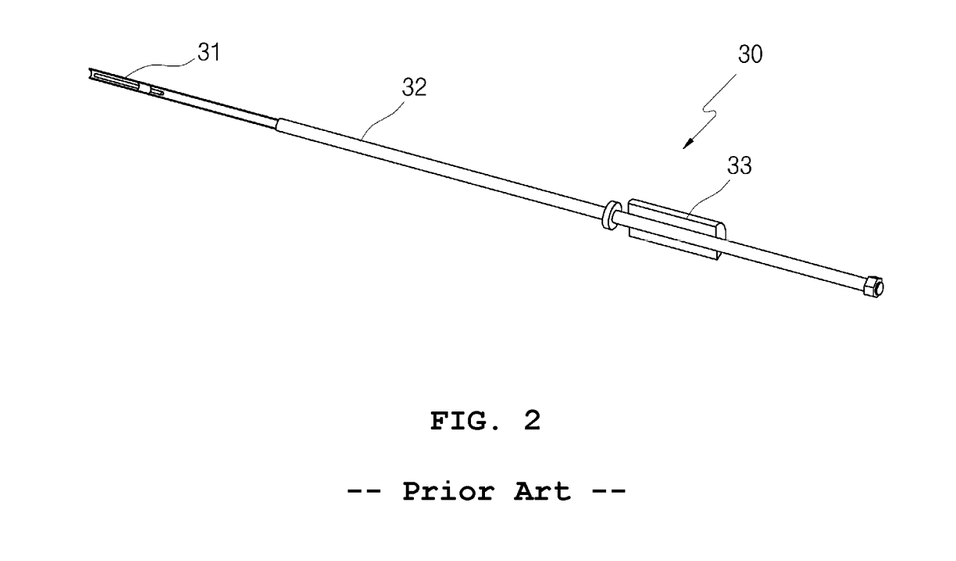
FIG. 2 is a view showing a nuclear fuel rod end distance adjusting device according to a related art.

At this time, the conventional nuclear fuel rod 20 end distance adjusting device 30 for the adjustment of the insertion length of the nuclear fuel rod 20, as shown in FIG. 2, includes fuel rod tongs 31, an insertion rod 32, and an insertion weight 33.

A process for the adjustment of the insertion length of the nuclear fuel rod 20 using the nuclear fuel rod end distance adjusting device 30 is as follows.

The distance adjusting device 30 is coupled to an end portion of the nuclear fuel rod 20 that requires adjustment of the insertion length using the fuel rod tongs 31.

Thereafter, an impact is applied to the insertion weight 33 toward an opposite direction in which the nuclear fuel rod 20 is coupled.

At this time, the insertion rod 32 is moved in an impacting direction, whereby the fuel rod tongs 31 installed on the insertion rod 32 pull the nuclear fuel rod 20.

Thereafter, after the insertion weight 33 is returned to an original position, again, an impact is applied to the insertion weight 33 toward the opposite direction in which the nuclear fuel rod 20 is coupled.

Through this repeating process, the insertion length of the nuclear fuel rod 20 is adjusted, and through this series of processes, the insertion length of a plurality of nuclear fuel rods 20 constituting the nuclear fuel assembly 10 is adjusted.

However, the conventional nuclear fuel rod end distance adjusting device 30 described above has the following problems.

First, the adjustment of the conventional nuclear fuel rod end distance adjusting device 30 through a method of impacting the insertion weight 33 has a problem in which a fine adjustment of the insertion length of the nuclear fuel rod 20 is difficult to be accomplished.

That is, the difference in a degree of movement of the insertion weight 33 according to a degree of impact may occur greatly, so it is difficult to precisely adjust the insertion length of the nuclear fuel rod 20.

Second, there is a problem in which the impact generated in the insertion weight 33 when the impact is applied to the insertion weight 33 may be transmitted to the nuclear fuel rod 20, whereby the nuclear fuel rod 20 may be damaged.

Third, in the process of returning the insertion weight 33 having been applied the impact, the insertion weight 33 may push the insertion rod 32 instead of pulling the insertion rod 32 due to the carelessness of a worker, thereby eventually causing problems of pushing the nuclear fuel rod 20.

DOCUMENTS OF RELATED ART

Patent Document

Korean Patent No. KR 10-0982297

DISCLOSURE

Technical Problem

Accordingly, the present invention has been made keeping in mind the above problems occurring in the related art, and an objective of the present invention is to provide a nuclear fuel rod end distance adjusting device that enables an adjustment of the insertion length of a nuclear fuel rod to be more precisely and conveniently performed by using a method of converting a rotational motion into a linear motion and, in parallel therewith, allows the adjustment of the nuclear fuel rod end distance to be stably and efficiently performed by preventing the rotational movement from being transmitted to the charging rod.

Technical Solution

In order to accomplish the above objective, the present invention may provide a nuclear fuel rod end distance adjusting device, the device including: an insertion rod including nuclear fuel rod tongs and linearly moving forward and backward; a housing having a hollow space; insertion power means installed inside the housing and moving in a longitudinal direction of the housing by converting a rotational motion into a linear motion; a connector connected between the insertion power means and the insertion rod; and an anti-rotation tool installed between the insertion power means and the connector, being capable of moving in the longitudinal direction of the housing by being interlocked with the linear motion of the insertion power means, but preventing rotational force of the insertion power means from being transmitted to the connector.

At this time, the insertion power means may be composed of a ball screw, a rotation space in which one end portion of a male screw of the ball screw is idled may be provided at one end portion of the anti-rotation tool, and the connector may be fixed to an opposite end portion of the anti-rotation tool.

In addition, a guide long-hole may be provided in the longitudinal direction of the housing in the housing, and a moving pin guided along the guide long-hole may be installed in the anti-rotation tool.

In addition, the nuclear fuel rod tongs may be screwed to the insertion rod, and the insertion rod may screwed to the connector, wherein the nuclear fuel rod tongs may be configured to be screwed to the connector.

Advantageous Effects

As described above, a nuclear fuel rod end distance adjusting device according to the present invention has following effects.

First, the device according to the present invention is configured to pull the nuclear fuel rod by converting a rotational motion into a linear motion using a ball screw method, thereby giving an effect in which insertion length of the nuclear fuel rod can be more finely adjusted.

In particular, by adjusting the insertion length of the nuclear fuel rod through a rotation method, there is an effect in which convenience for an adjustment of the insertion length of the nuclear fuel rod can be increased.

Second, when adjusting the insertion length of the nuclear fuel rod, there is an effect in which the nuclear fuel rod can be prevented from being damaged by an external force such as an impact applied thereto and the like.

Third, there is an effect in which the distance adjusting device can be easily used through a guide pin regardless of fuel types.

Fourth, the insertion rod can be interlocked only with the linear motion of a ball screw, thereby giving an effect that movement of the nuclear fuel rod can be stably and efficiently accomplished.

BEST MODE

The terms or words used in the present specification and claims are not to be construed as being limited to ordinary or lexical meanings. In addition, on the basis of the principle that the concept of terms may be properly defined in order to best describe his or her invention, it should be interpreted in a sense and concept consistent with the technical idea of the present invention.

Hereinafter, a nuclear fuel rod end distance adjusting device according to an exemplary embodiment of the present invention will be described with reference to FIGS. 3 to 7.

The nuclear fuel rod end distance adjusting device has a technical feature that allows an adjustment of the nuclear fuel rod end distance to be finely accomplished using the principle of ball screw operation and increases convenience of an adjustment of a nuclear fuel rod end distance.

The nuclear fuel end distance adjusting device is configured to include an insertion rod 100, a housing 200, insertion power means 300, a connector 400, and an anti-rotation tool 500.

The insertion rod 100 is medium means for pulling a nuclear fuel rod 20 by being coupled to the nuclear fuel rod 20 of a nuclear fuel assembly 10 and includes nuclear fuel rod tongs 110.

The nuclear fuel rod tongs 110 are configured to be directly coupled to the nuclear fuel rod 20, and attachment and detachment means is provided at an end of the nuclear fuel rod tongs 110 so as to be detachably attached to the insertion rod 100.

At this time, the attachment and detachment means is not specifically provided but may be configured to allow the nuclear fuel rod tongs 110 to be screwed to the insertion rod 100.

For example, an end portion of the nuclear fuel rod tongs 110 is configured in a shape of tongs capable of gripping the nuclear fuel rod 20, and an opposite end portion of the nuclear fuel rod tongs 110 may be configured to be a male screw or a female screw.

Accordingly, a female screw or a male screw corresponding to the male screw or female screw of the nuclear fuel rod tongs 110 is provided to the insertion rod 100 so that the nuclear fuel rod tongs 110 are detachably attached to the insertion rod 100.

With this configuration, the insertion rod 100 may be adjusted in length depending on the attachment and detachment of the nuclear fuel rod tongs 110.

Next, the housing 200 is configured to allow various parts for linearly moving the insertion rod 100 to be installed and may be provided in a shape of a hollow cylinder.

At this time, opposite sides of the housing 200 are open. Next, a front cover 210 is installed at an end of the housing 200, and the insertion power means 300 is installed at an opposite end of the housing 200.

A guide tube 211 in which the connector 400 is moved is provided in the front cover 210, and a plurality of coupling grooves 212 to which the guide pin 220 is coupled are provided at an edge of the front cover 210.

The guide pin 220 is inserted into a hole of an FR guide plate and is configured to prevent the adjusting device from being rotated when a male screw part 320 for the adjustment of the nuclear fuel rod end distance is rotated.

Figure 7:
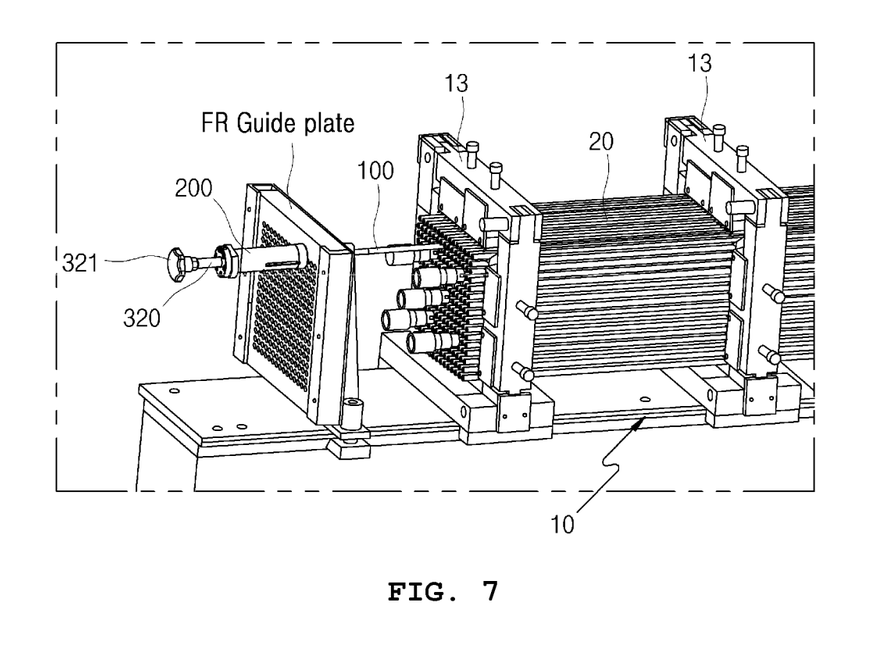
FIG. 7 is a use state diagram showing a state in which an adjustment of a nuclear fuel rod end distance is accomplished using the nuclear fuel rod end distance adjusting device according to the exemplary embodiment of the present invention.

This may be understood through FIG. 7.

At this time, a plurality of the guide pins 220 is provided in various diameters and is detachably attached to the coupling groove 212 of the front cover 210 as described above.

Figure 3:
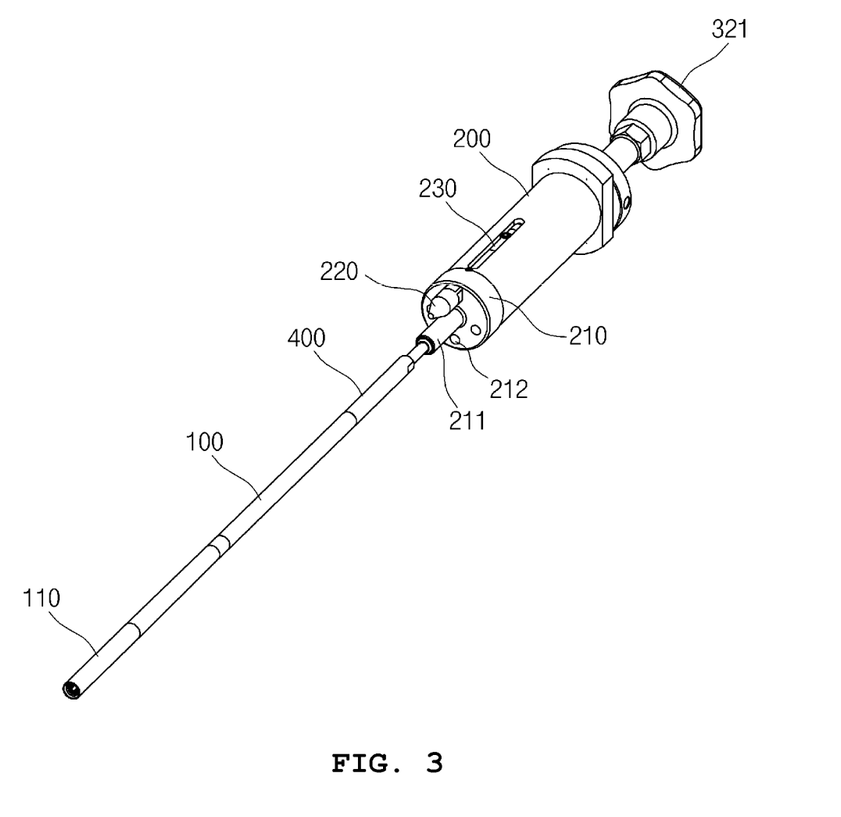
FIG. 3 is a perspective view showing a nuclear fuel rod end distance adjusting device according to an exemplary embodiment of the present invention.
Figure 4:
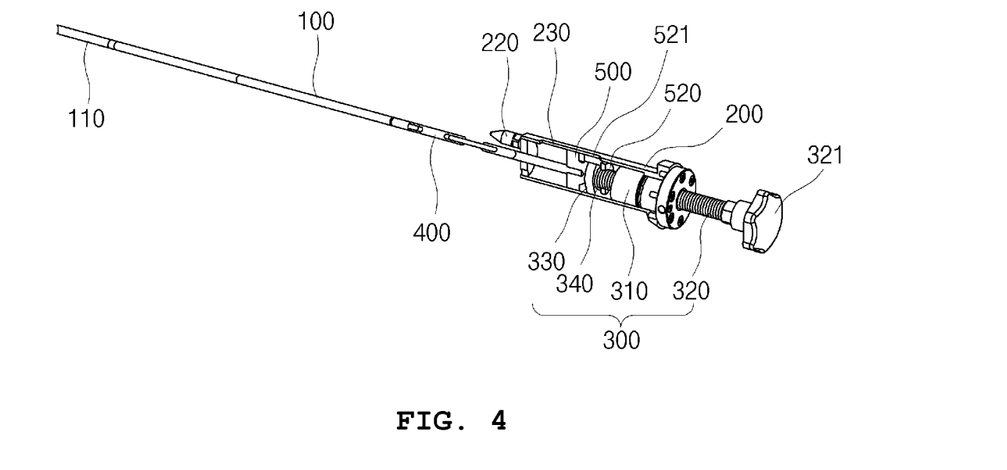
FIG. 4 is a perspective view showing by cutting a portion of the nuclear fuel rod end distance adjusting device according to the exemplary embodiment of the present invention.

At this time, a tip portion of the guide pin 220 may be provided in a streamlined shape as shown in FIGS. 3 and 4.

By such a configuration, the guide pin 220 of various diameters may be selectively positioned in the coupling groove 212 of the front cover 210, so that the nuclear fuel rod end distance adjusting device may be installed regardless of fuel types.

Meanwhile, a guide long-hole 230 communicating with an inside of the housing 200 is provided in the housing 200.

The guide long-hole 230 is a configured to guide a movement path when the anti-rotation tool 500 moves by the insertion power means 300 and is provided in a shape of the long-hole in a longitudinal direction of the housing 200.

Next, the insertion power means 300 generates power to move the insertion rod 100 straight and is installed at a rear of the housing 200.

The insertion power means 300 may be configured to allow an adjustment of the insertion length of the insertion rod 100 to be more precisely accomplished.

To this end, the insertion power means 300 may be configured to convert the rotational motion into a linear motion.

Accordingly, the insertion power means 300 is not particularly limited but may be provided as a ball screw assembly as shown in FIG. 4.

The ball screw assembly 300 is configured to include a female screw part 310, a male screw part 320, a plug 330, and a bearing 340.

The female screw part 310 is provided so that the male screw part 320 may be screwed and includes a plurality of steel balls (not shown) that roll along a female thread.

The female screw part 310 is fixed to the housing 200 while shielding the open rear of the housing 200.

The female screw part 310 is provided in a cylinder shape corresponding to the inner diameter of the housing 200.

In addition, the male screw part 320 is screwed to the female screw part 310 and rotates, with the female screw part 310 as a reference, to perform a linear motion in a longitudinal direction of the housing 200.

At this time, one end of the male screw part 320 is located inside the housing 200, and an opposite end of the male screw part 320 is located outside the housing 200.

At this time, a handle 321 may be provided at the opposite end of the male screw part 320 so that the male screw part 320 may be easily gripped.

In addition, the plug 330 serves to push or pull the anti-rotation tool 500 by interfering with the anti-rotation tool 500 during a linear motion according to the rotational motion of the male screw part 320 and is coupled to the one end portion of the male screw part 320.

The plug 330 may be provided with a diameter larger than the diameter of the male screw part 320 and may be provided in a circular shape.

At this time, between the plug 330 and the one end of the male screw part 320, a bearing 340 for smoothly rotating the male screw part 320 may be installed.

Next, the connector 400 serves to connect the insertion rod 100 and the insertion power means 300.

That is, one end portion of the connector 400 is connected to the insertion rod 100 side, and an opposite end portion of the connector 400 is connected to the insertion power means 300 side.

At this time, a male screw or a female screw for screwing the insertion rod 100 or the nuclear fuel rod tongs 110 is provided at the one end portion of the connector 400.

The one end portion of the connector 400 is disposed on the outside of the housing 200 through a guide tube 211 so as to be connected to the insertion rod 100, and the opposite end portion of the connector 400 is located at the inside of the housing 200.

Next, the anti-rotation tool 500 serves to prevent the rotational force of the male screw part 320 of the insertion power means 300 from being transmitted to the insertion rod 100.

That is, the linear motion of the insertion power means 300 is generated through the rotational motion of the male screw part 320. When the insertion rod 100 is directly connected to the male screw part 320, the insertion rod 100 also rotates together with a male screw portion 320, so the nuclear fuel rod 20 may be damaged. Accordingly, the anti-rotation tool 500 prevents the rotation of the insertion rod 100 and allows the insertion rod 100 to move straight.

Accordingly, the anti-rotation tool 500 is moved inside the longitudinal direction of the housing 200 by being interlocked with the linear motion, generated by the rotational motion, of the male screw part 320.

The male screw part 320 is coupled to one end portion of the anti-rotation tool 500, and the connector 400 is coupled to an opposite end portion of the anti-rotation tool 500.

Looking in detail with respect to the anti-rotation tool 500 is as follows.

A rotation space 510, in which the plug 330 of the insertion power means 300 is located and is idled, is provided at the one end portion of the anti-rotation tool 500 and is provided in a cylinder shape corresponding to the inner diameter of the housing 200.

At this time, a shielding cap 520 that shields the rotation space 510 is coupled to the anti-rotation tool 500, and a through-hole 521 through which the male screw part passes is provided in the shielding cap 520.

That is, by such a configuration, the plug 330 and the bearing 340 are located in the rotation space 510 of the anti-rotation tool 500 and are shielded by the shielding cap 520.

In addition, a fixing means for fixing the connector 400 is provided at the opposite end of the anti-rotation tool 500.

The fixing means may also be provided in a configuration in which the connector 400 may be screwed but is not limited to such a configuration.

In addition, a moving pin 530 that may be guided along the guide long-hole 230 of the housing 200 in a process of moving inside the housing 200 is installed in the anti-rotation tool 500.

Hereinafter, a process of adjusting the insertion length of the nuclear fuel rod using the nuclear fuel rod end distance adjusting device having the above-described configuration will be described.

A plurality of the nuclear fuel rods 20 is inserted into the spacer grids 13 of the nuclear fuel assembly 10.

At this time, the end distance of the inserted nuclear fuel rods 20 may not be uniform with each other, and an operator adjusts the end distance of the nuclear fuel rods 20 using a nuclear fuel rod distance adjusting device.

To this end, a guide pin 220 is mounted on the front cover 210 of the housing 200, and the guide pin 220 is coupled to the FR guide plate of the assembly bench of the nuclear fuel assembly as shown in FIG. 7.

Accordingly, the nuclear fuel rod end distance adjusting device is fixed to the FR guide plate of the assembly bench of the nuclear fuel assembly, as shown in FIG. 7, and the insertion rod 100 faces the nuclear fuel rod 20 correspondingly.

At this time, it is understood that the size of the guide pin 220, and the location of the guide pin 220 on the front cover 210 of the housing 200 may be adjusted according to the type of the nuclear fuel.

In addition, in consideration of a distance between the FR guide plate of the assembly bench of the nuclear fuel assembly and the fuel rod 20, the length of the insertion rod 100 may also be adjusted.

As opposite ends of the insertion rod 100 are screwed to the nuclear fuel rod tongs 110 and the connector 400 through attachment and detachment means, respectively, the length of the insertion rod 100 may be shortened by allowing the nuclear fuel rod tongs 110 to be directly screwed to the connector 400.

That is, it is possible to make the length of the insertion rod 100 long or short to be appropriate to the distance between the FR guide plate of the assembly bench of the nuclear fuel assembly and the fuel rod 20.

Next, an end portion of the nuclear fuel rod 20 to be inserted is gripped by using the nuclear fuel rod tongs 110 of the insertion rod 100 corresponding to the nuclear fuel rod 20.

Next, the operator rotates the male screw part 320 by grabbing the handle 321 of the male screw part 320 of the ball screw that is the insertion power means 300.

Figure 5:
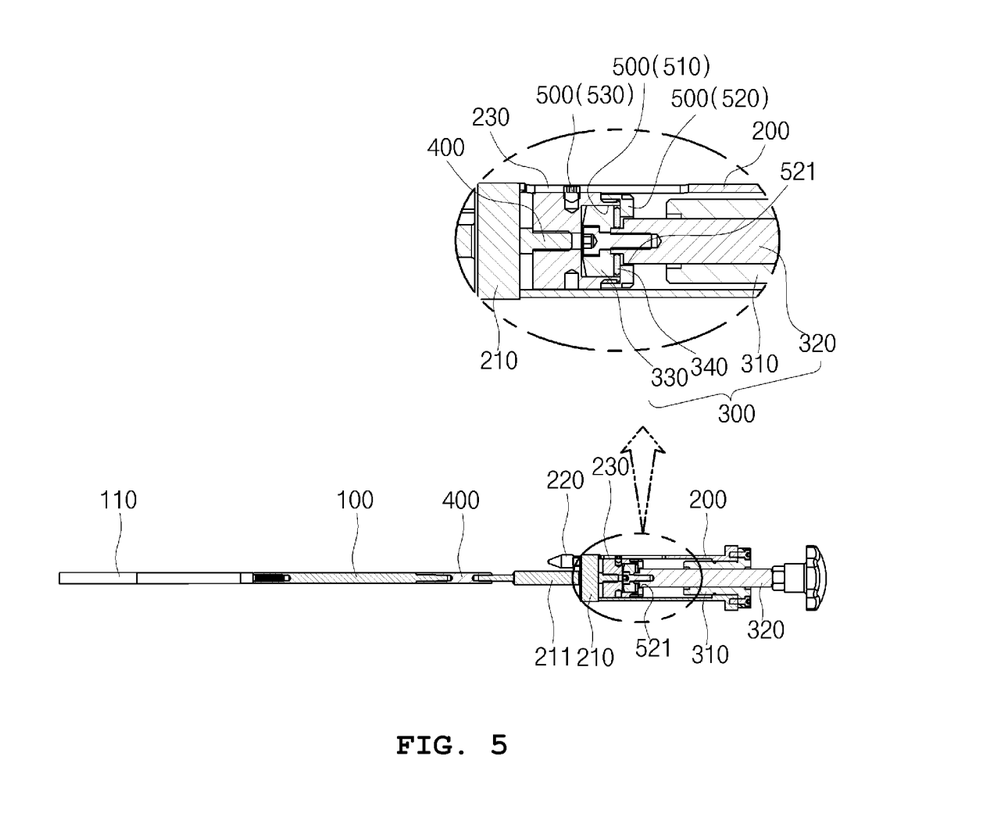
FIGS. 5 and 6 are sectional views showing a state in which an insertion rod of the nuclear fuel rod end distance adjusting device according to the exemplary embodiment of the present invention is moved forward and rearward, respectively.
Figure 6:
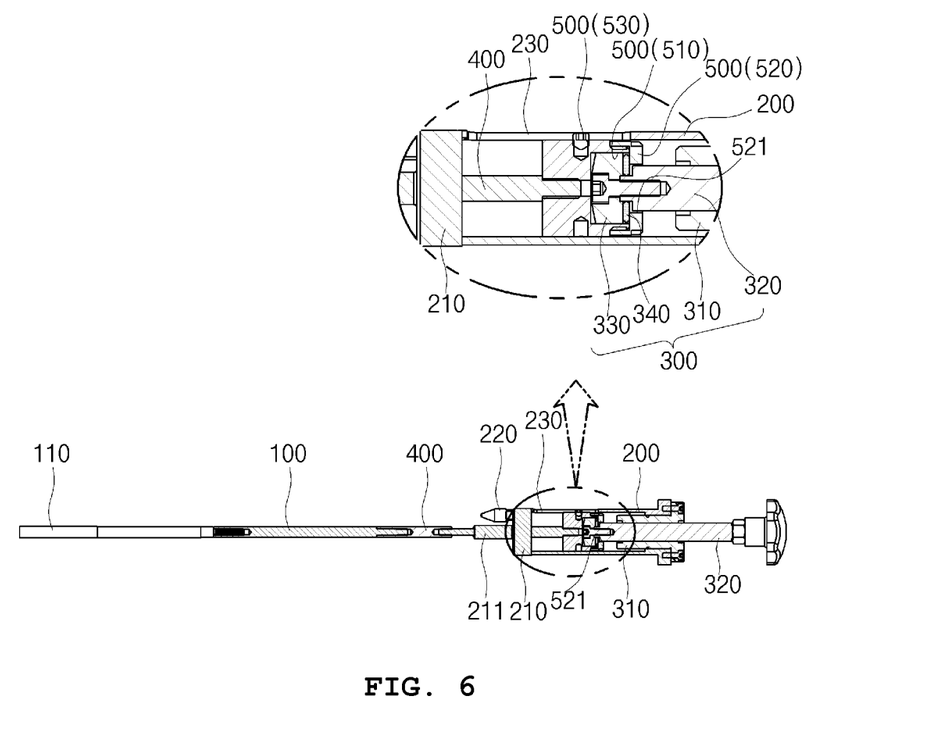

At this time, a rotation direction of the male screw part 320 refers to a direction in which the insertion rod 100 may be pulled to the right in the drawing, as shown in FIGS. 5 and 6.

On the other hand, when being rotated, the male screw part 320 moves in the linear motion along the spiral of the female screw part 310. At this time, the plug 330 coupled to the end portion of the male screw part 320 pulls the shielding cap 520 of the anti-rotation tool 500 while idling in the rotation space of the anti-rotation tool 500.

Accordingly, as shown in FIG. 6, the anti-rotation tool 500 is interlocked along the linear motion direction of the male screw part 320 and is moved in the longitudinal direction of the housing 200.

At this time, the moving pin 530 of the anti-rotation tool 500 guides the stable movement of the anti-rotation tool 500 while moving along the guide long-hole 230.

On the other hand, by the movement of the anti-rotation tool 500, the connector 400 coupled to the anti-rotation tool 500 moves the insertion rod 100 in the moving direction of the male screw portion 320.

At this time, the connector 400 is not directly coupled to the male screw part 320, but is configured to be coupled to the anti-rotation tool 500, so it is not interlocked with the rotation of the male screw part 320. Accordingly, only the linear motion may be accomplished according to the linear motion of the male screw part 320.

Accordingly, the nuclear fuel rod 20 connected to the insertion rod 100 also only moves straight in accordance with the movement of the connector 400.

At this time, it is understood that the rotation range of the male screw part 320 for the adjustment of the nuclear fuel rod 20 end distance may be determined by the operator. Accordingly, since the movement of the insertion rod 100 may be finely controlled through the rotational motion of the male screw part 320, it is possible to increase the accuracy of adjustment of the nuclear fuel rod 20 end distance.

As described so far, the nuclear fuel rod end distance adjusting device according to the present invention has a technical feature that enables detailed adjustment of the nuclear fuel rod end distance to be performed by applying a configuration of the insertion power means that converts the rotational motion into the linear motion.

In particular, in the case of a conversion into the linear motion according to the rotational motion, the insertion rod combined with the nuclear fuel rod is allowed to perform only the linear motion without the rotational motion, so the adjustment of the nuclear fuel rod end distance may be stably and efficiently performed without causing damage to the nuclear fuel rod.

Accordingly, convenience and accuracy for the adjustment of the nuclear fuel rod end distance may be enhanced.

In the above, the present invention has been described in detail with respect to the described embodiments, but it is apparent to those skilled in the art that various modifications and variations are possible within the technical scope of the present invention, and it is natural that such modifications and modifications belong to the appended claims.

DESCRIPTION OF THE REFERENCE
NUMERALS IN THE DRAWINGS

| | |
|---|---|
| 100: Insertion rod | 110: Nuclear fuel rod tongs |
| 200: Housing | 210: Front cover |
| 211: Guide tube | 212: Coupling groove |
| 220: Guide pin | 230: Guide long-hole |
| 300: Insertion power means | 310: Female screw part |
| 320: Male screw part | 330: Plug |
| 340: Bearing | 400: Connector |
| 500: Anti-rotation tool | 510: Rotation space |
| 520: Shielding cap | 521: Through-hole |
| 530: Moving pin | |

The invention claimed is:

1. A nuclear fuel rod end distance adjusting device, the device comprising:
   an insertion rod including nuclear fuel rod tongs and configured to linearly move forward and backward;
   a housing having a hollow space;
   insertion power means installed inside the housing and configured to move in a longitudinal direction of the housing by converting a rotational motion into a linear motion;
   a connector connected between the insertion power means and the insertion rod; and
   an anti-rotation tool installed between the insertion power means and the connector, being capable of moving in the longitudinal direction of the housing by being interlocked with the linear motion of the insertion power means, but preventing rotational force of the insertion power means from being transmitted to the connector.

2. The device of claim 1, wherein the insertion power means comprises a ball screw,
   a rotation space provided at an end portion of the anti-rotation tool, wherein an end portion of a male screw of the ball screw is idle in the rotation space, and
   the connector is fixed to an opposite end portion of the anti-rotation tool.

3. The device of claim 1, wherein a guide long-hole is provided in the longitudinal direction of the housing in the housing, and a moving pin guided along the guide long-hole is installed in the anti-rotation tool.

4. The device of claim 1, wherein the nuclear fuel rod tongs are screwed to the insertion rod, and the insertion rod is screwed to the connector,
   wherein the nuclear fuel rod tongs are configured to be screwed to the connector.

5. The device of claim 2, wherein a guide long-hole is provided in the longitudinal direction of the housing in the housing, and a moving pin guided along the guide long-hole is installed in the anti-rotation tool.

6. The device of claim 2, wherein the nuclear fuel rod tongs are screwed to the insertion rod, and the insertion rod is screwed to the connector,
   wherein the nuclear fuel rod tongs are configured to be screwed to the connector.

\* \* \* \* \*